United States Patent [19]

Tuchyner et al.

[11] 4,047,117
[45] Sept. 6, 1977

[54] MULTI-LEVEL LASER ILLUMINATOR

[75] Inventors: Harold J. Tuchyner, Los Angeles; Robert C. Benson, Canoga Park, both of Calif.

[73] Assignee: Hughes Aircraft Company, Culver City, Calif.

[21] Appl. No.: 754,285

[22] Filed: Dec. 27, 1976

Related U.S. Application Data

[63] Continuation of Ser. No. 434,145, Jan. 17, 1974, abandoned.

[51] Int. Cl.$^2$ .......................... H01S 3/00; F41G 7/00
[52] U.S. Cl. .................................. 330/4.3; 244/3.16; 250/199; 332/7.51; 331/DIG. 1
[58] Field of Search ............................ 356/4, 5, 152; 332/7.51; 331/94.5 A; 330/4.3; 250/199; 244/3.16

[56] References Cited

U.S. PATENT DOCUMENTS

| | | | |
|---|---|---|---|
| 3,242,440 | 3/1966 | Koester et al. | 330/4.3 |
| 3,298,024 | 1/1967 | Bohm | 343/12 |
| 3,602,594 | 8/1971 | Cook et al. | 356/5 |
| 3,644,042 | 2/1972 | Kolb, Jr. et al. | 356/5 |
| 3,652,161 | 3/1972 | Ross | 356/5 |
| 3,848,999 | 11/1974 | Dall'Armi | 356/4 |

FOREIGN PATENT DOCUMENTS

| | | | |
|---|---|---|---|
| 1,914,250 | 10/1970 | Germany | 244/3.16 |

Primary Examiner—S.C. Buczinski
Attorney, Agent, or Firm—Walter J. Adam; William H. MacAllister, Jr.

[57] ABSTRACT

An improved laser illuminator for target designation, such as for a target-seeking missile or object in flight or from a tracking target station, that simultaneously provides output pulses of high peak power at a low pulse repetition rate to meet the maximum range requirements of the designation or tracking system and provides output pulses of low peak power at a high pulse repetition rate to provide the high tracking error signal information rates needed at close ranges. The illuminator operates either for active or semi-active guidance of a missile to a target or for tracking an object or target from any suitable station in either an active or semi-active mode. In one arrangement in accordance with the invention, a laser oscillator is controlled in series with an amplifier arrangement to selectively provide the high power and the low power pulses which are transmitted as a common pulse train. In another arrangement in accordance with the invention, dual oscillators are provided in parallel to develop the low power and the high power pulses. The illuminator operates with a relatively small average power and thermal dissipation and as a consequence, has relatively small size and weight requirements for any given level of overall performance.

11 Claims, 5 Drawing Figures

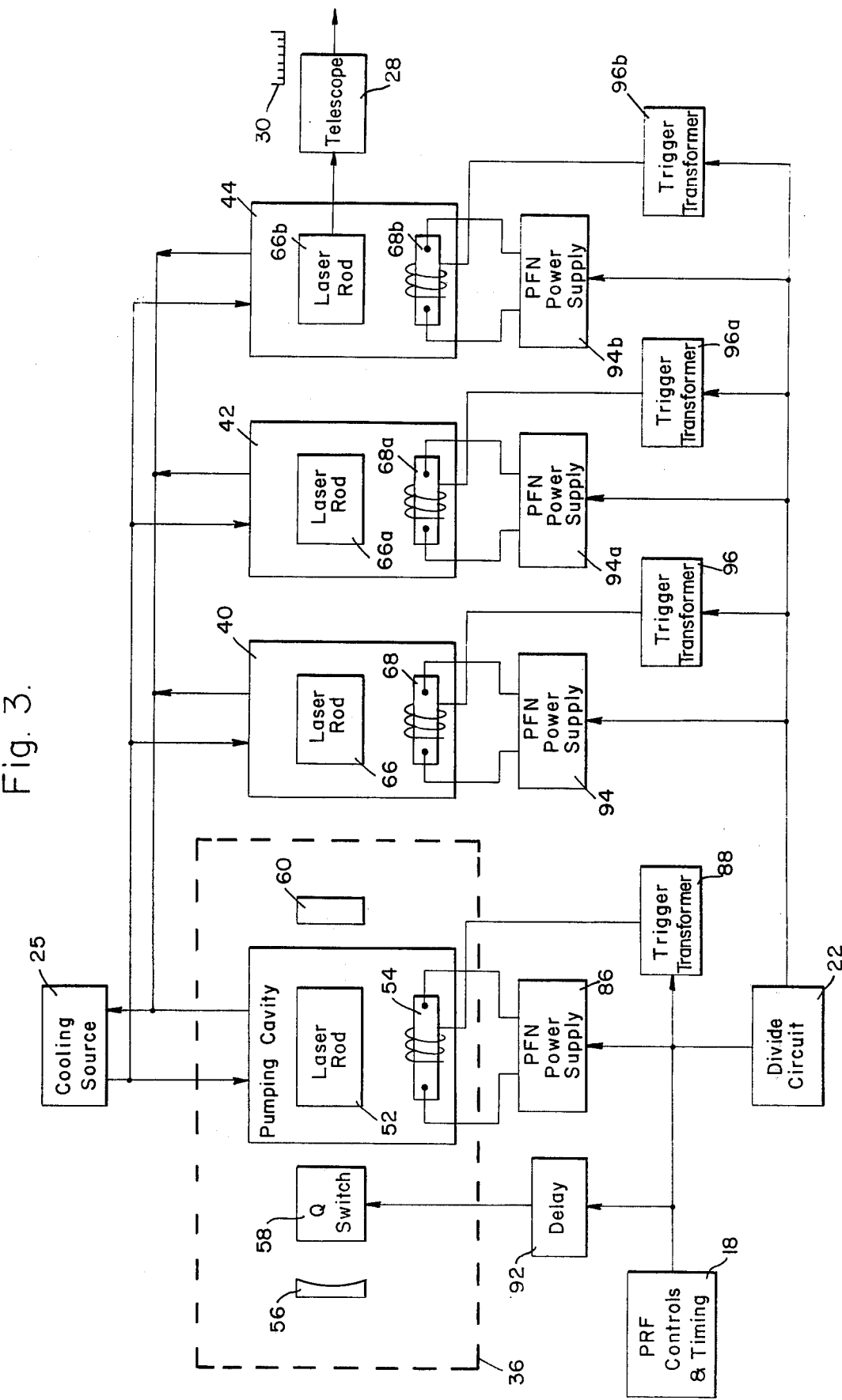

MULTI-LEVEL LASER ILLUMINATOR

This is a continuation of application Ser. No. 434,145, filed Jan. 17, 1974, now abandoned.

BACKGROUND OF THE INVENTION

1. Field of the Invention

This invention relates to laser target illuminator systems and particularly to a simplified and light weight target illuminator that provides both high peak power pulses at a low pulse rate suitable for long range acquisition or tracking and low power pulses at a high pulse rate suitable for short range acquisition or terminal guidance.

2. Description of the Prior Art

Laser target illuminators may be utilized for guidance of missiles or for tracking a target and may function in a system operating either in the active or semi-active state. Active guidance or tracking occurs when both the illuminator and the receiver are on the same missile or at the same station and semi-active guidance or tracking occurs when the illuminator is at one position such as in an aircraft, ship or on the ground and the receiver is at another position such as in a missile or other aircraft. Laser target illuminators may be utilized to provide both tracking or ranging at a relatively long range and may be utilized to provide tracking or ranging at relatively short ranges, such as for terminal guidance or rangefinding. Conventional illuminators use a relatively constant peak pulse power level and are therefore limited in satisfying both the long range acquisition and the short range terminal guidance requirements simultaneously except by using a relatively high average power illuminator with its associated heat dissipation power supply and weight problems. For long range operations, the attenuation of the laser energy by the atmosphere is such that high power pulses are required in order that sufficient energy is reflected back to the receiver while at shorter ranges relatively low amplitude pulses may be utilized. On the other hand, at long ranges target tracking accuracy is not critical and low tracking data rates, and low pulse repetition rates may be tolerated, while at short ranges high tracking data rates and high pulse repetition rates are required. It would be a substantial advantage to the art if a laser illuminator system were developed that would operate well at both long and short ranges and provide suitable data rates for both ranges with the system utilizing a minimum amount of average power and having a minimum amount of complexity.

SUMMARY OF THE INVENTION

The disclosed laser illuminator system, operable at a station which may be stationary or on a moving craft and which may be for designating a target or operable in a moving target seeking vehicle, generates high peak power pulses at a relatively low pulse repetition rate for long range target illumination within a common pulse train also containing low peak power pulses at a high pulse repetition rate for short range illumination such as for terminal missile guidance. As a result, the system provides average power and heat dissipation requirements substantially reduced from the requirements of conventional systems. In one arrangement in accordance with the invention, the laser transmitter consists of a laser oscillator stage followed by a selected number of laser amplifier, stages with the oscillator stage normally operating at a first pulse repetition rate and at every nth oscillator cycle the amplifier stages are activated to provide additional output energy of relatively high power pulses. Thus the average laser output power is a relatively small percentage of the average output required if the full power of the low duty cycle pulses was obtained at the high pulse repetition rate.

It is therefore an object of this invention to provide a laser illuminator that operates satisfactorily at both long and short ranges with a minimum of average power.

It is a further object of this invention to provide a laser illuminator that operates both during target acquisition by a missile or tracking station and during terminal guidance of the missile or tracking station with a minimum of average power and thermal requirements.

It is a still further object of this invention to provide a laser illuminator system for target illumination that provides reliable operation with a minimum of both size and weight for any given level of overall performance.

It is another object of this invention to provide a simplified laser target illuminator system that operates at relatively long ranges and in relatively undesirable weather conditions while providing a high data rate for short range operation.

It is still another object of this invention to provide a highly compact and simplified laser target illuminator for semi-active guidance of a moving missile that meets the high peak power requirements of long range acquisition by the missile of a designated target and the high pulse repetition frequency requirements of short range guidance of the missile to the target.

BRIEF DESCRIPTION OF THE DRAWINGS

The novel features of this invention as well as the invention itself both as to its method of organization and method of operation, will be best understood from the accompanying description taken in connection with accompanying drawings, in which like reference characters refer to like parts, and in which;

FIG. 3 is a schematic block diagram of an arrangement of the laser illuminator system of FIG. 2 with the laser oscillator and amplifiers operated in series;

DESCRIPTION OF THE PREFERRED EMBODIMENT

Figure 1:
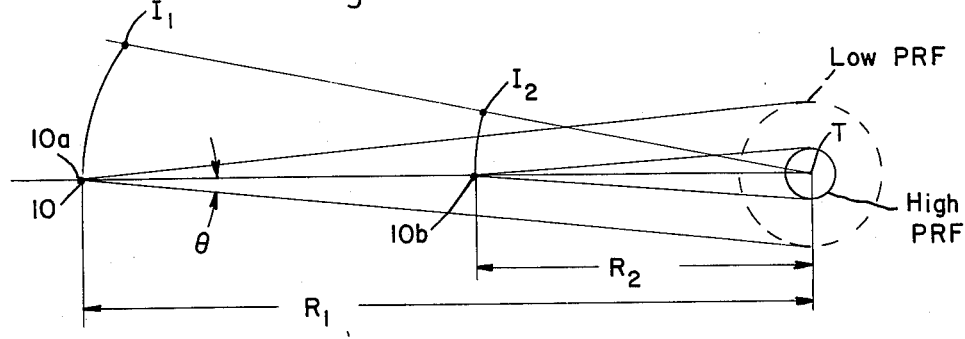
FIG. 1 is a schematic plan view of a missile and a target for explaining the requirements of power and pulse repetition frequency during both long range acquisition and during terminal guidance of an active or semi-active missile.

Referring first to FIG. 1 which is a plan view of a missile 10 at a position 10a moving toward a target T, it can be seen that since the missile 10 is at a relatively long range from the target T, there is no need to precisely locate the target as long as the target stays within the missile's tracking system field of view $\theta$ and that the missile may guide toward the target in response to a relatively low data rate. When the missile 10 moves close to the target T at position 10b, the missile is in the final, terminal guidance mode requiring accurate target tracking, therefore requiring high tracking data rates and thus requiring a high pulse repetition frequency illumination. Thus, for the long range position at 10a a low pulse repetition transmission rate and the corresponding low tracking data rate may be utilized while providing sufficient time to effect angular changes and corrections. For the short range position at 10b a high pulse repetition rate and the corresponding high rate of tracking data rate is required because the missile must rapidly change the direction of flight if required to hit the target T. Because the return signal is proportional to $[e^{-K(R_D+R_T)}]/R_T^2$ where $R_D$ is the range from the designator to the target and $R_T$ is the range from the missile or tracking station to the target and the target diameter is smaller than the laser beam diameter, relatively high power pulses are required at the longer ranges of target acquisition in order to receive sufficient energy at the receiver. For an active system, the range $R_D$ is equal to $R_T$ and is represented by $R_1$ or $R_2$ while for a semi-active system, the range $R_D$ is from the illuminator such as at $I_1$ or $I_2$ to the target T and $R_T$ is from the target to the receiver such as at 10a or 10b. It is to be noted that although FIG. 1 is shown in the azimuth dimension, a similar principle applies in the elevation dimension for the acquisition and terminal guidance requirements. It is to be noted that the principles of the invention applicable to a missile are equally applicable to any shell, projectile or moving object. Also the principles of the invention applicable to operation at a station are equally applicable to stationary as well as to moving stations such as an aircraft, ship or any moving vehicle or craft.

Figure 2:
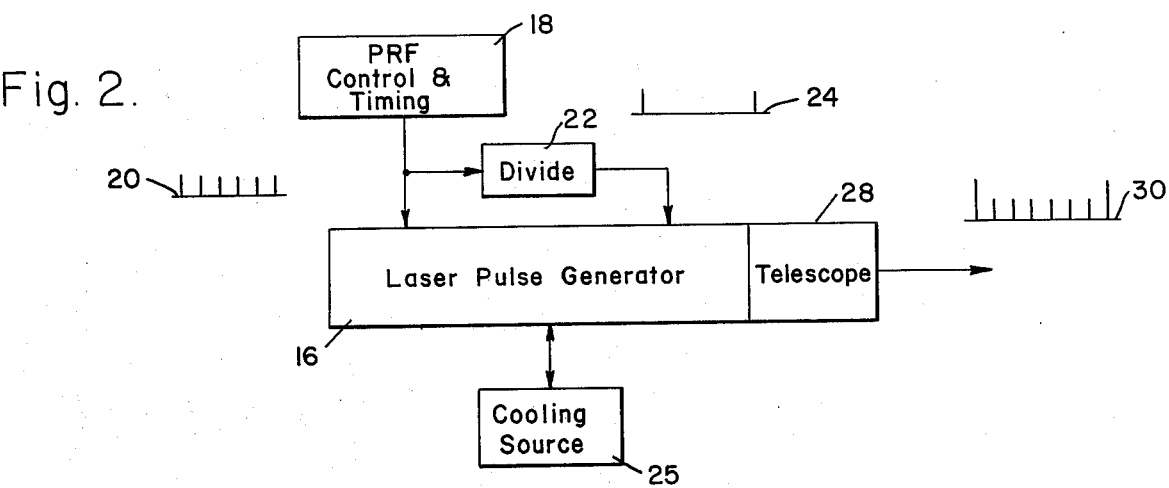
FIG. 2 is a schematic block diagram of the multipower level laser illuminator system in accordance with the invention.

Referring now to the block diagram of FIG. 2, a laser pulse generator 16 is provided being responsive to a PRF (Pulse Repetition Frequency) control and timing unit 18 developing a series of control pulses at a relatively high frequency as shown by a waveform 20 and responsive to a divide circuit 22. The timing unit 18 applies pulses to the divide circuit 22 which develops a series of control pulses at a relatively low PRF as shown by a waveform 24. The laser pulse generator 16 in one arrangement in accordance with the invention (FIG. 3), may include an oscillator and a selected number of laser amplifiers arranged in series and responding to control pulses of the waveforms 20 and 24 to pass the laser pulses through a collimating telescope 28 to be transmitted in space as a composite pulse train indicated by a waveform 30. Also the principles of the invention are applicable to other arrangements (FIG. 5), such as one having two lasers operating in parallel and responding to the control pulses of the waveforms 20 and 24 to provide a composite output pulse of the waveform 30. Thus, the laser illuminator develops high energy pulses at a low pulse repetition rate that will provide sufficient energy reception for long range operation and develops pulses at a high pulse repetition rate that have a sufficient data rate to meet the requirements of short range operation such as for accurate terminal guidance. A cooling source 25 is coupled to the laser pulse generator and because of the relatively low average power utilized for operation of the system of the invention, is only required to handle a relatively small level of heat dissipation.

A power source (not shown) supplies power to the laser pulse generator and is similarly required to supply a relatively small amount of power. Referring now to FIG. 3 which shows the multi-level illuminator in accordance with the invention, operating with an oscillator 36 and laser amplifiers 40, 42 and 44 coupled in a series arrangement to pass a composite pulse of the waveform 30 through the telescope 28 and into space. The laser pulse generator 16 of FIG. 2 may be considered to include the oscillator 16 and the amplifiers 40, 42 and 44 with their associated control circuitry. The laser oscillator 36 includes a pumping cavity 50 having a laser rod 52 and a pumping lamp 54 with the cavity cooled from the cooling source 25 by a suitable gas or liguid, as is well known in the art. A total reflective mirror 56 is positioned along the optical axis with a Q-switch 58 which may be a Pockel cell, for example, positioned between the mirror 56 and the laser rod 52 outside of the pumping cavity 50. A partially transmitting and reflecting mirror 60 is positioned at the opposite end of the laser rod 52 to provide an output pulse of laser energy. The amplifier 40 includes a laser rod 66 with a lamp 68 included in a pumping cavity 70, as is well known in the art. The laser oscillators 42 and 44 are similar to the oscillator 40 and having the components respectively designated by the same numbers except with the addition thereto of subscripts $a$ and $b$. The collimating telescope 28 receives the pulse trains that pass from the last oscillator stage 44 for transmission to the target to be illuminated. The oscillator 36 has its lamp 54 energized by a PFN (Pulse Forming Network) power supply 86 which may receive a timing control signal from the PRF control and timing circuit 18. A trigger transformer 88 is coupled to the lamp 54 for triggering the tube at each PRF interval as determined by the PRF control and timing circuit 18.

The Q switch 58 is controlled by a timing pulse received from the circuit 18 and delayed by a delay circuit 92 so that the laser rod energy inversion has attained a sufficient level before the pulse is allowed to be passed to the reflective mirror 56. The flash lamp 68 also has a PFN power supply 94 and is triggered by a trigger transformer 96 to optically pump the laser rod 66 and thereby to provide amplification of the pulses received from the oscillator 36. The power supply 94 responds to a timing control signal provided by the divide circuit 22 receiving the high PRF pulses from the timing circuit 18 and developing low PRF pulses as required for the system operation. Trigger transformers 96a and 96b, as well as PFN power supplies 94a and 94b of the amplifiers 42 and 44, also receive the lower PRF control signals from the divide circuit 22.

The laser rod 52 of the laser oscillator stage 36 may be any suitable material as neodymium (Nd): YAG or Nd: glass or ruby as are well know in the art and the oscillator stage may, for example, operate at a nominal 30 pulses per second (PPS) repetition rate at 50 millijoules per pulse output for a Q-switched Nd: YAG system. Thus the PRF control and timing circuit 18 may provide control pulses at a rate of 30 pulses per second. It is to be noted that the pulse repetition rate may be precisely controlled at selectable rates to provide a plurality of pulse repetition rate codes, as are well known in the art. In this illustrated example during every sixth oscillator cycle, the amplifier stage would be activated to provide additional output energy such as pulses of one-half to one joule. It is to be noted that if necessary, and within the scope of the invention, the oscillator stage could be pumped harder during the high energy pulse cycle than in the low energy pulse cycles to provide a very large high energy pulse. The rods of the amplifier stages 40, 42 and 44 may be any suitable material such as Nd: YAG or Nd: glass or ruby to spectrally match the oscillator laser rod 52.

Figure 4:
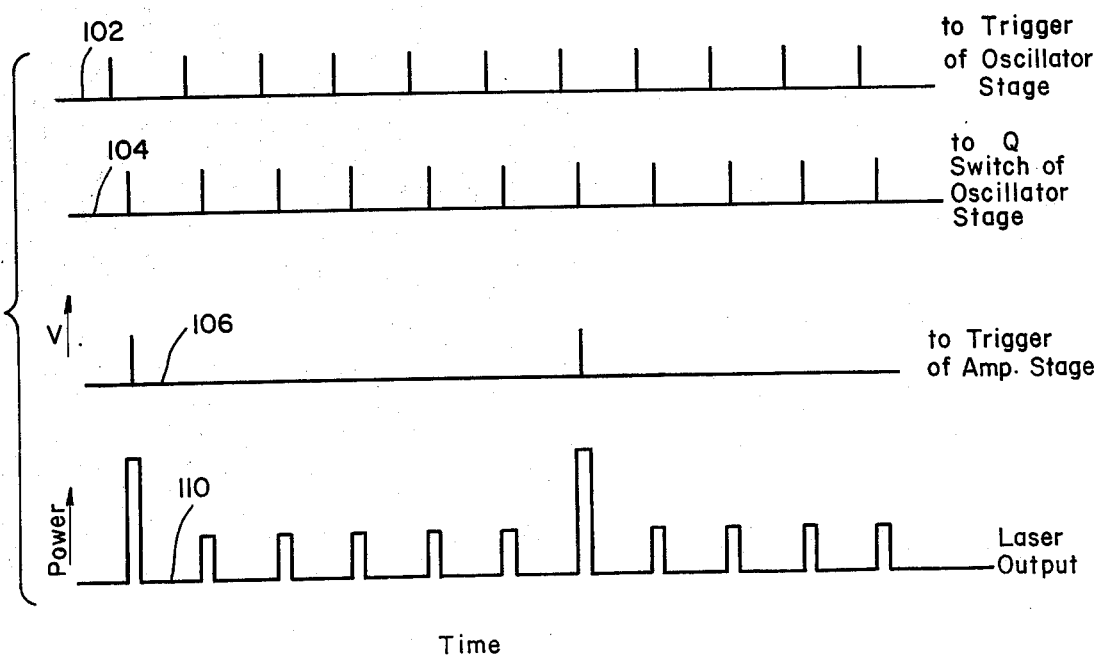
FIG. 4 is a schematic diagram of either voltage or power as a function of time for further explaining the operation of the laser illuminator of FIG. 3.

Referring now also to the waveforms of FIG. 4, the PRF control pulses from the circuit 18 are shown by a waveform 102 and the control pulse applied to the Q-switch 58 after a slight delay td are shown by a waveform 104, both having for the illustrated example, a pulse repetition frequency of 30 pulses per second. After the control signal of the waveform 102 is applied to the divide circuit 22, the control pulse of the waveform 106 having a pulse repetition frequency of 5 pulses per second is applied to the trigger transformers 96, 96a and 96b of the amplifiter stages. A combined or composite pulse train of a waveform 110 is the illuminator output signal from the amplifier stage 44 as well as after being collimated in the telescope 28, for illuminating the target during both long range and short range operation. For acquisition, the missile may, for example, have a threshold circuit to respond only to returns from the high power, low PRF pulses and during terminal guidance to respond to returns from all of the low power high PRF pulses in addition.

The illustrated Q switched designator delivering 50 millijoules at 30 pulses per second and nearly one joule at 5 pulses per second with the oscillator pumped at 12 joules results in an oscillator heat load of 360 watts that must be dissipated. The net laser output through the amplifier rods when unpumped is approximately 50 millijoules per pulse and when pumped at 80 to 90 joules and 5 pulses per second, the total laser output during the high energy pulse cycle is 800 millijoules to one joule per pulse. It is to be noted in the illustrated example, the amplifier heat load is approximately 400 watts which is substantially the same as the oscillator heat load. Consequently all laser rods will be at nearly the same temperature so that spectral-bandwidth matching is assured for optimum aplification. Thus, because of the relatively low heat loss or low average heat loss, the rod and flash lamp cooling is greatly simplified by the system of the subject invention.

The average laser output in the illustrated example is about 6.5 watts which is about 20 percent of the average output required if the full one joule per pulse output was obtained at the 30 pulses per second rate. Thus, considerable electrical power input and cooling power is saved while still achieving sufficient pulse energy for long range operation and high repetition rates for short range operation.

Figure 5:
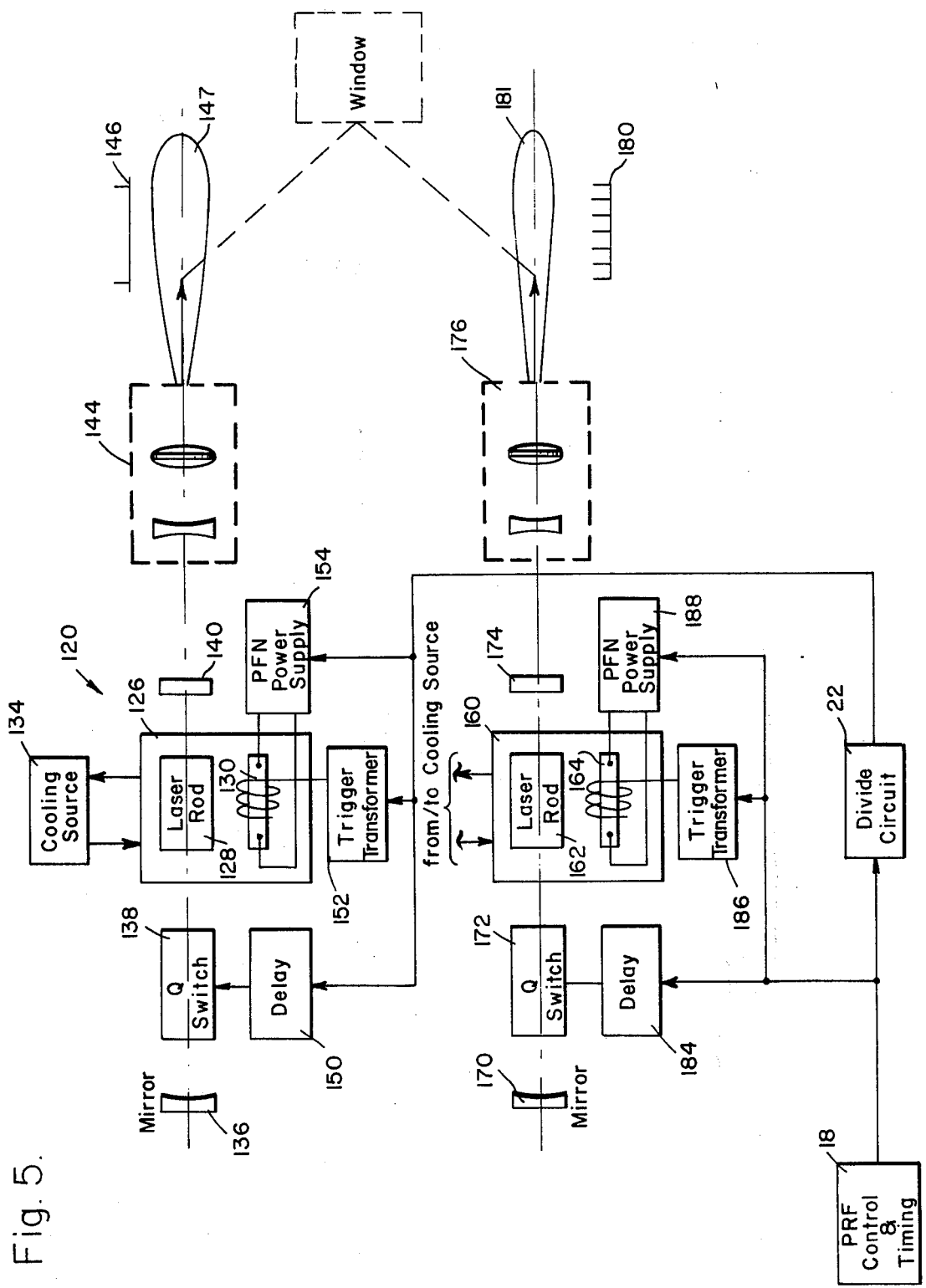
FIG. 5 is a schematic block diagram of a laser illuminator system in accordance with the invention utilizing dual oscillators operating in parallel with a relatively simplified collimating system.

The principles of the invention are not limited to the arrangement of FIG. 3 and the two-level laser designator or illuminator may utilize dual parallel operating oscillators, as shown in FIG. 5 responding to the control pulses to provide combined high PRF and low PRF pulses. The high energy low repetition rate pulses are provided by a first oscillator 120 and the low energy high repetition rate pulses are provided by a second oscillator 122. The high power oscillator 120 requires that a relatively large diametr rod 128 be utilized because rod size is proportional to peak power. A separate low magnification collimating telescope 144 may be utilized for the larger diameter rod high energy oscillator 120 because at longer ranges less angular accuracy is required for acquisition. Thus, at long target ranges where high designator pulse energies are required, tracking precision is not required and a relatively small low-power collimating telescope 144 and large laser spot sizes are allowable on the target. In some instances telescope 144 may not be needed at all. For the low energy high PRF pulses, a narrow beam must be formed for short range accuracy, but because of the small laser rod a relatively small though high power collimating aperture and optical arrangement of a telescope 176 is satisfactory.

The oscillator 120 includes a pump cavity 126 having a laser rod 128 and a flash lamp 130 therein with the cavity cooled from a suitable cooling source 134. A mirror 136 and a Q-switch 138 which may be a Pockel cell for example, is provided at one end of the cavity 126 and a partially transmissive mirror 140 is provided at the output end of the cavity, to apply pulses to the low magnification wide beam collimating telescope 144 which in turn transmits high energy low repetition rate pulses of a waveform 146. The transmitted energy may have a relatively large transmissive beam width as shown by a beam 147 which is suitable for long range operation because more time is available to make tracking corrections, for example. The PRF control and timing source 18 supplies pulses through a divide circuit 22 and through a delay circuit 150 to the Q-switch 138 as well as to a trigger transformer 152 and a pulse forming network (PFN) and power supply 154 for controlling the flash lamp 130.

The oscillator 122 includes a pump cavity 160 having a laser rod 162 and a lamp 164 with the rod 162 being only required to be of sufficient size to handle the relatively low power pulses while the rod 128 of the oscillator 120 is required to have sufficient size to handle the large power pulses without rod damage. The cooling source 134 may also be utilized to cool the pump cavity 160 with a suitable cooling material such as a gas or a liquid. At one end of the cavity 160 are provided a totally reflective mirror 170 and a Q-switch 172 which, for example, may be a Pockel cell and a partially transmissive mirror 174 is positioned at the output end of the cavity 160 to apply low power pulses through the high magnification, narrow beam collminating telescope 176. The transmitted pulses have a low energy and a high repetition rate as shown by waveform 180 and the collimator 176 is selected so that the pulses are transmitted with a relatively narrow beam 181. The collimator 176 operates without excessive aperture size and weight, and with a minimum of complexity required in the optics because of the relatively small diameter of the rod 162. The high PRF pulses from the PRF control timing circuit 18 are applied through a delay circuit 184 to the Q-switch 172 and are also applied from the PRF control circuit 18 to a trigger transformer 186 and to a pulse forming network and power supply 188 for controlling the lamp 164. A dotted box 190 coupled to the two telescopes by dotted lines illustrates that a common window or some common optics may be utilized in the system.

Thus, in the arrangement of FIG. 5 a relatively large laser beam collimator structure is not required because of the use of a separate wide beam collimating telescope, if any, for the large rod. For the high PRF oscillator, only a relatively small collimating telescope 176 is required because of the low power requirements and therefore small rod 162 providing a narrow beam for the short range operation. The dual oscillator approach provides satisfactory missile guidance because at long target ranges where high designator pulse energies are required, tracking precision is not required and broad laser spot sizes are allowable at the target. In some designator systems in accordance with the invention the system may operate without a collimator for the high energy oscillator. For the low energy high repetition rate oscillator, relatively good tracking precision is required, but a narrow beam and narrow laser spots on the target are provided by a relatively small size collimator. The low repetition rate pulses of the waveform 146 and high repetition rate pulses of the waveform 180 are effectively combined on the target and reflected therefrom as a common pulse train and the arrangement of FIG. 5 provides both effective operation at long ranges such as for acquisition and operation at short ranges such as for terminal guidance. The arrangement of FIG. 5 has the advantages in accordance with the invention that a relatively small power consumption and heat dissipation is utilized in operation.

The principles of the invention are also applicable to illuminators utilized in tracking as well as in guidance and to illuminators utilizing lasers other than solid state laser such as gas lasers in which an electron discharge arrangement and associated controls are utilized for triggering the gas, as is well known in the art, or in liquid lasers, which are optically pumped as are the solid state lasers, as is well known in the art.

Thus, there has been provided a single laser target illuminator assembly for designating or tracking to provide both high peak power pulses for long range operation such as target acquisition or tracking and a high pulse rate for accurate short range operation such as terminal guidance to a target or tracking. The system generates high peak power pulses at a relatively low duty cycle within a common pulse train containing low peak power pulses at a relatively high duty cycle for long and short range requirements respectively. The average power and heat dissipation requirements are substantially reduced which in turn leads to a reduction of both size and weight of the designator in accordance with the invention for any given level of overall performance. Another advantage of the illuminator of the invention is that it can be manufactured using conventional laser components. The principles of the invention include both a single oscillator arrangement and a dual oscillator configuration, the latter having a simplified collimating system in some arrangements in accordance with the invention. Also, the principles of the invention are applicable to gas medium laser systems and liquid medium lasers as well as lasers using solid state rods or mediums.

What is claimed is:

1. A laser target illuminator comprising
laser oscillator means for generating high power pulses and low power pulses,
a first control source coupled to said laser oscillator means for generating said high power pulses at a first pulse rate,
a second control source coupled to said laser oscillator means for generating said low power pulses at a second pulse rate higher than said first pulse rate, and
optical means responsive to said laser oscillator means to transmit a combined pulse train toward said target.

2. The combination of claim 1 in which said laser oscillator means includes laser rods of a Neodymium: YAG material.

3. The illuminator of claim 1 in which said laser oscillator means includes a laser oscillator and at least one laser amplifier arranged in a series optical path with said optical means,
means coupling said first control source to said laser oscillator, and
means coupling said second control source to all of said laser amplifiers.

4. The illuminator of claim 3 in which said second control source provides pulses at a selected pulse repetitive frequency and said first control source is a divide circuit responsive to said second control source to provide amplification of selected pulses provided by said laser oscillator.

5. The illuminator of claim 1 in which said laser oscillator meand includes first and second laser oscillators operating in parallel, said first laser oscillator providing high energy low repetition rate pulses in response to said first control source, and said second laser oscillator providing low energy high repetition rate pulses in response to said second control source.

6. The illuminator of claim 5 in which said optical means includes first and second collimators and said first collimator receives a pulse train from said first laser oscillator and said second collimator receives a pulse train from said second laser oscillator with said first collimator providing a relatively wide beam and said second collimator providing a relatively narrow beam.

7. The illuminator of claim 5 in which said optical means includes narrow beam collimating means responsive to the train pulse from said second laser oscillator.

8. A laser illuminator system for designating a target from a moving craft comprising:
oscillator means including a laser rod, a reflective mirror, a partially transmissive mirror, a Q-switch and a triggering lamp, for developing laser energy,
at least one amplifier means coupled in series with said oscillator means including a laser rod and a triggering lamp for amplifying said laser energy,
a source of timing pulses coupled to said Q-switch and said triggering lamp of said oscillator means,
dividing means coupled between said source of timing pulses and said triggering lamp of all of said amplifier means; and
collimating means responsive to the energy at the output from all of said amplifier means to transmit a combined pulse of a high pulse repetition rate from said oscillator means and a low pulse repetition rate when said amplifier means is triggered.

9. The combination of claim 8 in which the laser rods for said oscillator means and for all of said amplifiers means is of a Neodymium: YAG material.

10. A laser illuminator system for designating a target from a moving craft comprising
first and second oscillator means each including a laser rod, a reflective mirror, a partially transmissive mirror, a Q-switch and a triggering lamp, for developing laser energy, said first and second oscillator means respectively providing low power and high power pulses,
a source of low PRF timing pulses coupled to said Q-switch and said triggering lamp of said first oscillator means, and
a source of high PRF timing pulses coupled to said Q-switch and said triggering lamp of said second oscillator means.

11. The combination of claim 10 in which the laser rods of said first and second oscillator means are of a Neodymium: YAG material.

* * * * *